United States Patent
Haverlag et al.

(10) Patent No.: US 10,314,144 B2
(45) Date of Patent: Jun. 4, 2019

(54) INTELLIGENT LUMINAIRE

(71) Applicant: SIGNIFY HOLDING B.V., Eindhoven (NL)

(72) Inventors: Marco Haverlag, Mierlo (NL); Mareel Beij, Sint Oedenrode (NL); Harry Broers, 'S-Hertogenbosch (NL); Hugo Jose Krajnc, Eindhoven (NL); Ruben Rajagopalan, Neuss (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/767,728

(22) PCT Filed: Sep. 28, 2016

(86) PCT No.: PCT/EP2016/073075
§ 371 (c)(1),
(2) Date: Apr. 12, 2018

(87) PCT Pub. No.: WO2017/063882
PCT Pub. Date: Apr. 20, 2017

(65) Prior Publication Data
US 2018/0295704 A1 Oct. 11, 2018

(30) Foreign Application Priority Data
Oct. 12, 2015 (EP) .................................. 15189349

(51) Int. Cl.
*H05B 37/02* (2006.01)
*H05B 33/08* (2006.01)
(52) U.S. Cl.
CPC ..... *H05B 37/0227* (2013.01); *H05B 33/0842* (2013.01); *H05B 37/0218* (2013.01);
(Continued)

(58) Field of Classification Search
CPC ............ H05B 37/0227; H05B 37/0272; H05B 37/0218; H05B 37/0245; H05B 37/0236;
(Continued)

(56) References Cited

U.S. PATENT DOCUMENTS 8,100,552 B2 * 1/2012 Spero ...................... B60Q 1/04
362/231
9,756,706 B2 * 9/2017 Breuer ............... H05B 37/0272
(Continued)

FOREIGN PATENT DOCUMENTS

WO 2010079388 A1 7/2010
WO 2015128765 A1 9/2015

*Primary Examiner* — Vibol Tan
(74) *Attorney, Agent, or Firm* — Meenakshy Chakravorty

(57) ABSTRACT

A luminaire comprising: at least one light source for emitting light to illuminate an environment; an optical sensor comprising an array of photodetectors, the sensor configured to output image data indicative of the intensity of light incident on the photodetectors; and a controller arranged to receive the image data, the controller comprising: a presence detection module configured to process the image data to detect whether a being is present in said environment, and control the light emitted by the light source(s) responsive to said detection; a light sensing module configured to process the image data to determine a light level in said environment and control the light emitted by the light source(s) based on said light level; and a commissioning module configured to control the controller to operate in a commissioning mode based on the image data; and configure the luminaire in accordance with a commissioning command received whilst the controller is operating in the commissioning mode.

14 Claims, 4 Drawing Sheets

(52) U.S. Cl.
CPC ..... *H05B 37/0236* (2013.01); *H05B 37/0245* (2013.01); *H05B 37/0272* (2013.01); *Y02B 20/44* (2013.01); *Y02B 20/46* (2013.01); *Y02B 20/48* (2013.01)

(58) Field of Classification Search
CPC ............ H05B 33/0857; H05B 33/0854; H05B 33/0845; H05B 33/0872; H05B 37/02; H05B 37/029; H05B 33/0812; H05B 37/0254; H05B 33/0815; H05B 33/0869; H05B 33/0884; Y02B 20/46; Y02B 20/48; Y02B 20/44
See application file for complete search history.

(56) References Cited

U.S. PATENT DOCUMENTS

| | | | |
|---|---|---|---|
| 9,955,551 B2 * | 4/2018 | Spero | B60Q 1/04 |
| 2012/0019663 A1 | 1/2012 | Raynor | |
| 2012/0032601 A1 | 2/2012 | Wendt et al. | |
| 2014/0167620 A1 | 6/2014 | Chobot | |
| 2014/0265879 A1 | 9/2014 | Dillen | |
| 2015/0220428 A1 | 8/2015 | Simonyi et al. | |
| 2015/0281905 A1 * | 10/2015 | Breuer | H04B 10/116 |
| | | | 398/118 |

* cited by examiner

INTELLIGENT LUMINAIRE

CROSS-REFERENCE TO PRIOR APPLICATIONS

This application is the U.S. National Phase application under 35 U.S.C. § 371 of International Application No. PCT/EP2016/073075, filed on Sep. 28, 2016, which claims the benefit of European Patent Application No. 15189349.2, filed on Oct. 12, 2015. These applications are hereby incorporated by reference herein.

TECHNICAL FIELD

The present disclosure relates to a luminaire comprising an optical sensor. In particular the present disclosure relates to the luminaire performing a plurality of functions based on the output of the optical sensor.

BACKGROUND

With recent advancements in the realm of the Internet-of-Things (IoT), and the digital revolution within the lighting domain, there is an increasing need to have a wide variety of sensing functionalities within smart lighting installations. Particularly, there is a strong need for sensor-driven lighting control systems as such systems reduce energy consumed by light sources, thereby providing significant cost-savings, and increase in the lifespan of the light source themselves.

One way of introducing connectivity into lighting systems is to use a wireless network which connects various luminaires together, and/or connects the luminaires to actuators like wall switches, room controllers and floor controllers. The advantage of a wireless network in comparison to more traditional wired lighting networks (e.g. networks based on Digital Addressable Lighting Interface (DALI)) is that installation of a wireless network is easier and therefore cheaper. Additionally, if space usage changes over time, changes to the installation are easier to make.

Intelligent lighting systems have evolved to equip each luminaire is with its own sensor node, rather than having several luminaires connected to one sensor node. This means that the sensor node is built into the luminaire itself, instead of in a separate hole in the ceiling or another location proximal to the luminaires.

Known luminaires typically comprise one or more light sources and a controller for controlling the light emitted from the light source(s). Sensing functionality is incorporated into the luminaire by way of a dedicated light sensor for local daylight adaptation and/or a dedicated presence sensor for presence detection. The controller is operable to control the light emitted from the light source(s) in response to sensor data received from the sensors. An indicator light source (e.g. a light emitting diode (LED)) is also typically included in the luminaire to provide a visual indication that presence has been detected (verification of its correct functioning towards the end-user).

In many cases the luminaire needs to be commissioned in order to group luminaires of the lighting system in terms of behavior, or to make them respond to each other's sensors in concert. In many cases, an infra-red (IR) receiver is incorporated into the luminaire, such receivers being capable of recognizing digital commands employing a communication protocol e.g. the RC-5 protocol developed by Philips.

SUMMARY

One problem of existing luminaires is that a separate sensor element is used for each sensor/actuator function, like photodiodes for light sensing, passive infrared (PIR) sensors for presence detection, indicator LEDs for the feedback and a thin small outline package (TSOP) IR detector for the commissioning interface. All these separate elements add to the overall system cost and also take up space, which adds to the physical size of the luminaire.

Moreover the current PIR sensors do not actually detect presence, but only movement in the direction lateral to the sensor, and also miss movements in the direction of the sensor. The effectiveness of presence detection of PIR sensors is therefore limited, which often leads to incorrect conclusions from the system that no one is there if they remain relatively still, and requires end-users to start 'waving' in order to keep the lights of a luminaire on.

According to one aspect of the present invention there is provided a luminaire comprising: at least one light source for emitting light to illuminate an environment of the luminaire; an optical sensor comprising an array of photodetectors, the optical sensor configured to output image data indicative of the intensity of light incident on the photodetectors; and a controller arranged to receive the image data, the controller comprising: a presence detection module configured to process the image data to detect whether a being is present in said environment, and control the light emitted by the at least one light source in response to said detection; a light sensing module configured to process the image data to determine a light level of light in said environment and control the light emitted by the at least one light source based on said light level; and a commissioning module configured to process the image data to recognize a command transmitted by a remote device indicating that the controller is to operate in a commissioning mode; based on reception of said command configure the controller to operate in the commissioning mode; whilst the controller is operating in the commissioning mode receive a commissioning command transmitted from the remote device; and configure the luminaire in accordance with the received commissioning command.

The commissioning module may be configured to: control the optical sensor to operate at a first sampling frequency; based on reception of said command, control the optical sensor to operate at a second sampling frequency for a predetermined time interval, the second sampling frequency higher than the first sampling frequency; and analyse the image data output from the one or more photodetectors during the predetermined time interval to receive said commissioning command.

The commissioning module may be configured to recognize said command based on a detection of an increase in intensity values output by only a subset of the photodetectors by at least a predetermined amount within a predetermined period of time.

The commissioning module may be configured to recognize said command based on a detection of an increase in intensity values output by a plurality of the photodetectors, the plurality of photodetectors forming a predetermined shape within said array of photodetectors.

The commissioning module may be configured to recognize said command based on a detection of light of one or more predetermined colour being incident on the array of photodetectors.

The commissioning module may be configured to recognize said command based on a detection of a predetermined intensity pattern of a light signal incident on the array of photodetectors.

The commissioning module may be configured to process the image data to recognize the commissioning command embedded in light emitted by the remote device.

The commissioning module may be configured to control the optical sensor to operate at the first sampling frequency upon expiry of the predetermined time interval.

The commissioning module may be configured to recognize a commissioning command embedded in light emitted by a remote device based on detection of a light pattern transmitted in accordance with a communication protocol.

The luminaire may comprise a wireless interface, and the commissioning module may be configured to receive the commissioning command via said wireless interface.

The presence detection module and the light sensing module may be disabled when the controller is operating in the commissioning mode.

The optical sensor may comprise at least one light source. In this embodiment, in response to detecting presence of a being in said environment, the presence detection module may be configured to control the at least one light source of the optical sensor to emit light to provide a visual indication that presence of the being has been detected. In response to recognizing said command, the commissioning module may be configured to control one or more of: (i) the at least one light source of the optical sensor, and (ii) the at least one light source of the luminaire, to emit light to provide a visual indication of reception of said command.

According to one aspect of the present invention there is provided a computer program product comprising code embodied on a computer-readable medium and being configured so as when executed on a processor of a luminaire, to: receive image data output from an optical sensor of the luminaire, the optical sensor comprising an array of photo-detectors and the image data is indicative of the intensity of light incident on the photodetectors; detect whether a being is present in said environment based on the image data, and control the light emitted by at least one light source of the luminaire in response to said detection; determine a light level of light in said environment based on the image data, and control the light emitted by the at least one light source based on said light level; and recognize a command transmitted by a remote device indicating that the controller is to operate in a commissioning mode based on the image data; based on reception of said command configure the controller to operate in the commissioning mode; whilst the controller is operating in the commissioning mode receive a commissioning command transmitted from the remote device; and configure the luminaire in accordance with the received commissioning command.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which.

DETAILED DESCRIPTION

Embodiments will now be described by way of example only.

Figure 1:
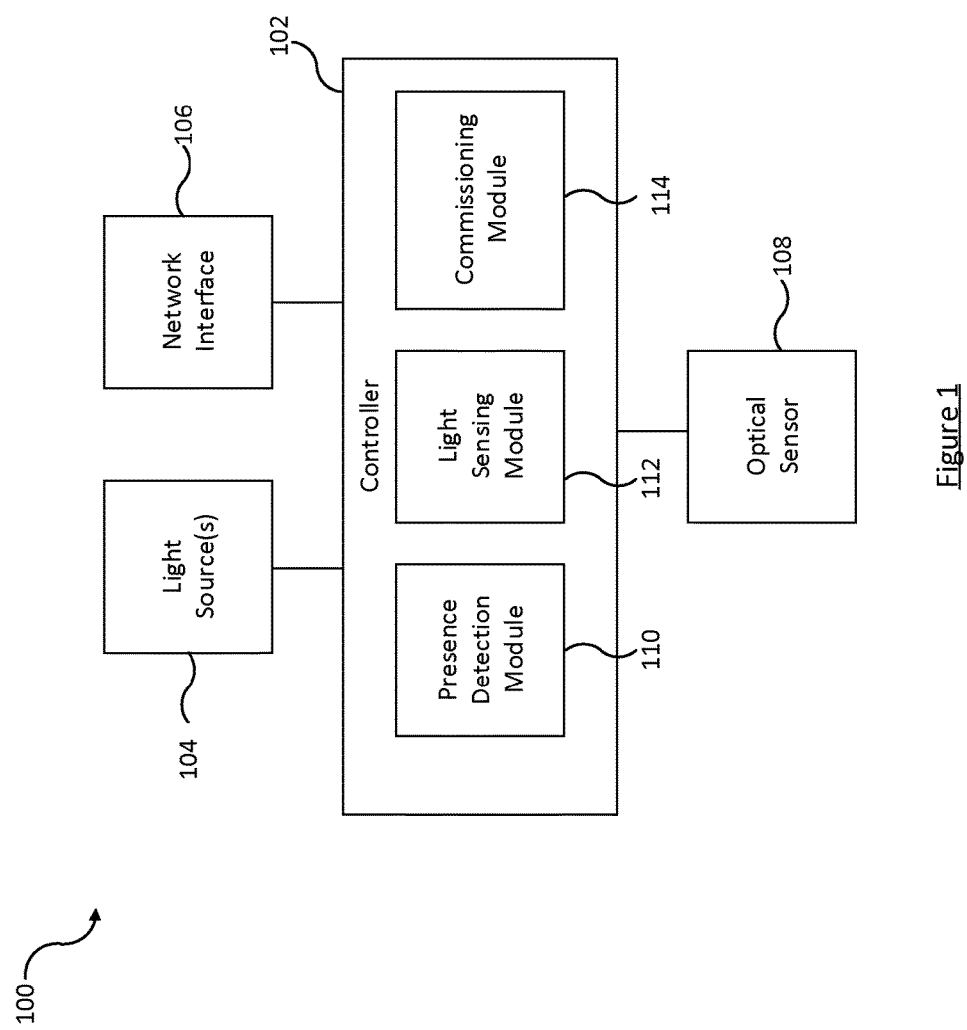
FIG. 1 illustrates a schematic block diagram of a luminaire.

Reference is first made to FIG. 1 which illustrates an example of a luminaire 100. The luminaire 100 is a device for emitting illumination for illuminating an environment, comprising at least one light source 104 such as an LED, an LED string or array, a gas discharge lamp or a filament bulb, plus any associated socket, housing and/or support.

The luminaire 100 is installed in an environment which may comprise an indoor space such as an office, meeting room, hotel room, waiting room, warehouse etc., and/or an outdoor space such as a garden or park, and/or a partially-covered environment such as a gazebo or stadium, and/or any other type of environment such as the interior of a vehicle.

The luminaire 100 may be installed at a fixed location within the environment, e.g. in the ceiling and/or walls, and/or on light poles fixed to the floor or ground. Alternatively the luminaire 100 may be portable.

The luminaire 100 comprises a controller 102 that is coupled to the light source(s) 104. The light source(s) 104 are controllable in that the light emitted by the light source(s) 104 may be controlled by the controller 102. The controller 102 is configured to control the light emitted by the light source(s) 104 by supplying lighting commands to the light source(s) 104.

The functionality of the controller 102 that is described herein may be implemented in code (software) stored on a memory comprising one or more storage media, and arranged for execution on a processor comprising on or more processing units. The code is configured so as when fetched from the memory and executed on the processor to perform operations in line with embodiments discussed below. The controller 102 may for example be an 8-bit, 16-bit, or 32-bit microcontroller. Alternatively it is not excluded that some or all of the functionality of the controller 102 is implemented in dedicated hardware circuitry, or configurable hardware circuitry like a field-programmable gate array (FPGA).

The controller 102 is coupled to an optical sensor 108. The optical sensor 108 comprises a two-dimensional array of light detecting elements (photodiode, phototransistor or other suitable device) also called pixels. The optical sensor 108 is configured to output image data indicative of the intensity of the light impinging upon each light detecting element. Thus, images captured by the optical sensor 108 can be represented as a two-dimensional array of intensity values (pixel data). As the optical sensor 108 converts an optical image focused on the sensor into electrical signals, it can be said that the optical sensor is an image sensor.

The optical sensor 108 reads the electronic signals output by the pixels in accordance with a frame rate (sampling frequency), the frame rate of the optical sensor 108 is the measure of how many times the full pixel array is read in a second, in other words how many images are captured in a second. Quantization of the samples is performed such that an intensity value for each pixel in the pixel array is output by the optical sensor 108. The intensity values may take one of $2^n$ values in dependence on the bit depth, n, of the optical sensor 108. For example using an optical sensor providing a bit depth of 8, intensity values may take one of 256 values.

The pixels in the pixel array of the optical sensor 108 sense light radiating from objects in a field of view (FOV) of the pixel array. The spectral response of the pixels in the pixel array describes the sensitivity of the pixels to light (optical radiation) of different wavelengths. The pixels in the pixel array respond to light in the visible spectrum (wavelengths from 390-700 nm for a typical human eye) and may also respond to portions of the infrared (IR) spectrum. Infrared radiation has two ranges, near infrared (NIR) light is closest in wavelength to visible light, and far infrared (FIR) is closer to the microwave region of the electromagnetic spectrum. The pixels in the pixel array may also respond to light in the NIR spectrum (wavelengths from 700 nm-1.4 μm).

The pixel array of the optical sensor 108 may have a low spatial resolution, for example 20×20 pixels. This low-pixel size type of optical sensor are commonly used in computer mouse applications. The financial cost of these kind of components is low due to the already large market for optical mice, and are sensitive enough to detect ambient light levels. This particular spatial resolution is merely an example, and the dimensions of the pixel array of the optical sensor 108 may take other values than this. For example, the pixel array of the optical sensor 108 may have a high spatial resolution (QVGA or more), with an integrated DSP processor that can report averaged intensities of regions of the field of view of the optical sensor 108 to the controller 102.

It is preferable that the optical sensor 108 is equipped with a suitable lens design that images a well-defined area of the environment of the luminaire (e.g. on a floor below the luminaire that is mounted in a ceiling) to the sensitive area (pixel array) of the optical sensor 108.

The controller 102 and the optical sensor 108 may communicate with each other via a connection which may be a serial interface like I²C (inter-integrated circuit), SPI (serial peripheral interface) or similar. Alternatively, the connection may be a parallel interface (e.g. 1× pin per resolution bit+some synchronization signals, etc.).

In embodiments of the present invention, the controller 102 uses the image data output by the optical sensor 108 to perform the various functions that are implemented using the separate components in the prior art luminaire, this is described in more detail below.

Figure 2:
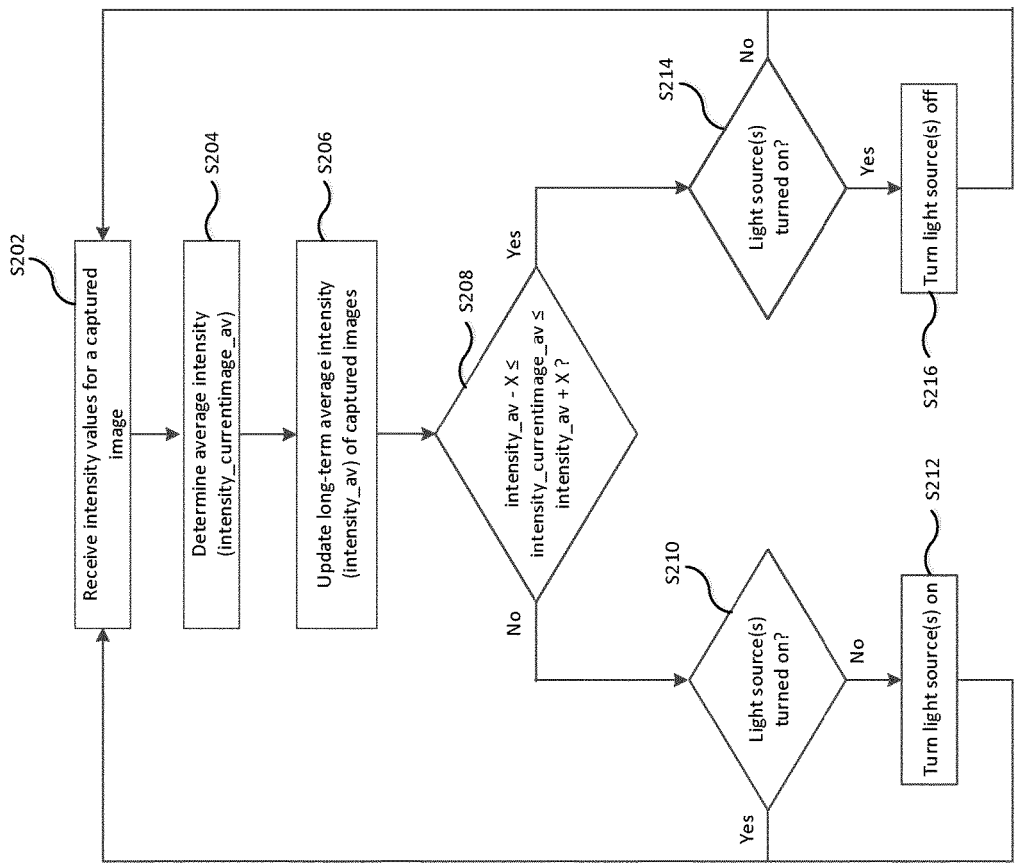
FIG. 2 is a flow chart of a method implemented by a controller to perform presence detection based on image data output from an optical sensor of the luminaire.

The controller 102 comprises a presence detection module 110 which is arranged to receive the pixel data (intensity values) of captured images output by the optical sensor 108. Reference is now made to FIG. 2 which is a flow chart of an example process 200 that may be implemented by the presence detection module 110 to perform presence detection based on the pixel data received from the optical sensor 108.

At step S202 the presence detection module 110 receives an intensity value from each of the pixels of the pixel array of the optical sensor 108, these intensity values define an image captured by the optical sensor 108.

At step S204 the presence detection module 110 determines an average of the plurality of intensity values that define the captured image, this is denoted intensity_currentimage_av in FIG. 2. The presence detection module 110 may perform this calculation itself, or the value of intensity_currentimage_av may be communicated from the optical sensor 108 to the presence detection module 110 (if the optical sensor 108 has the ability to report averaged intensities of regions of the field of view of the optical sensor 108).

The presence detection module 110 is configured to maintain a historical average of the average intensities of images captured by the optical sensor 108, this is denoted intensity_av in FIG. 2. The value of intensity_av may be stored in a memory of the luminarie 100 that is not shown in FIG. 1.

At step S206, the presence detection module 110 updates the value of intensity_av using the value of intensity_currentimage_av determined at step S204.

The presence detection module 110 may timestamp values of intensity_currentimage_av determined at step S202 and only allow values of intensity_currentimage_av that have been calculated within a certain time period from contributing to the calculation of intensity_av.

At step S208, the presence detection module 110 compares the average of the plurality of intensity values that define the captured image (intensity_currentimage_av) against the long-term average of the average intensities of images captured by the optical sensor 108 (intensity_av). In particular, the presence detection module 110 determines whether the intensity_currentimage_av value is within a threshold range around the intensity_av value. The threshold range is defined by an intensity value X whereby the lower bound of the threshold range is intensity_av−X, and the upper bound of the threshold range is intensity_av+X. The value X defining the threshold intensity range may not be constant and may be varied in dependence on other parameters (e.g. user-configurable or vary based on the time of day), or to increase detection sensitivity.

If the presence detection module 110 determines at step S208 that the intensity_currentimage_av value is not within the threshold range around the intensity_av value, this indicates that a being (e.g. human or animal) is present in the FOV of the optical sensor 208, and the process 200 proceeds to step S210.

At step S210, the presence detection module 110 determines whether the light source(s) 104 are turned on such that they are emitting light to illuminate the environment of the luminaire. If the light source(s) 104 are turned off, at step S212 the presence detection module 110 turns the light source(s) 104 on and the process 200 returns back to step S202. If the light source(s) 104 are already turned on, the presence detection module 110 takes no action and the process 200 returns back to step S202.

If the presence detection module 110 determines at step S208 that the intensity_currentimage_av value is within the threshold range around the intensity_av value, this indicates that a being (e.g. human or animal) is not present in the FOV of the optical sensor 208, and the process 200 proceeds to step S214.

At step S214, the presence detection module 110 determines whether the light source(s) 104 are turned on such that they are emitting light to illuminate the environment of the luminaire 100. If the light source(s) 104 are turned on, at step S216 the presence detection module 110 turns the light source(s) 104 off and the process 200 returns back to step S202. If the light source(s) 104 are already turned off, the presence detection module 110 takes no action and the process 200 returns back to step S202.

At step S216, the presence detection module 110 may be configured to wait a period of time before switching off the the light source(s) 104. That is, the presence detection module 110 utilizes a count-down timer which is reset when activity is detected, and turns the light source(s) 104 off when the period of time has elapsed (when the count-down timer has reached zero).

It will be apparent to persons skilled in the art, that the presence detection module 110 uses the pixel data (intensity values) of captured images output by the optical sensor 108 to detect actual presence rather than movement, and therefore the performance of the presence detection by the presence detection module 110 is greatly improved compared to the dedicated PIR presence sensors typically included in known luminaires.

Whilst in the process 200 illustrated in FIG. 2 the presence detection module 110 turns the light source(s) 104 on in response to a presence detection and turns the light source(s) 104 off in absence of a presence detection, this is merely an example. In embodiments, in response to a presence detection the presence detection module 110 is configured to control the light source(s) 104 in accordance with light settings associated with a presence detection (e.g. defining one or more of the intensity, colour, saturation, colour temperature, size, shape, pattern, and dynamics of the light emitted from the the light source(s) 104), and in absence of a presence detection the presence detection module 110 is configured to control the light source(s) 104 in accordance with further light settings. Thus it will be apparent that in absence of a presence detection, the presence detection module 110 may be configured to control the light source(s) 104 to emit light at a dim-downed light intensity and in response to a presence detection dim up (increase the light intensity) the light emitted by the light source(s) 104.

The optical sensor 108 may comprise one or more light source (e.g. an LED) that is integrated into the optical sensor. In response to detecting the presence of a being in the FOV of the optical sensor 208, the presence detection module 110 may control the light source(s) of the optical sensor 108 to provide a visual indication that presence has been detected. Using the light source(s) of the optical sensor 108 to provide this indication function removes the necessity for a dedicated indicator LED. This advantageously reduces the physical size of the luminaire 100.

In the embodiments describe above, at least two values of intensity_av may be used to cope with different situations where the situations where the light source(s) 104 are turned on/off due to the time of day (ambient light sensing discussed in more detail below).

It will be appreciated that the process 200 implemented by the presence detection module 110 is merely an example. In other embodiments, the presence detection module 110 may perform the presence detection based on background subtraction techniques whereby a background model is created for each individual pixel of the pixel array of the optical sensor 108 and presence of a being is detected by the subtraction of a current image pixel by pixel of the reference background image and the intensity difference at a pixel is above a threshold. In this method, for each pixel the expected pixel intensity and its boundaries depend on the time, luminaire state (defined by the light emitted by the light source(s) 104), and pixel location in the pixel array.

Referring back to FIG. 1, the controller 102 comprises a light sensing module 112 which is also arranged to receive the pixel data (intensity values) of captured images output by the optical sensor 108.

Figure 3:
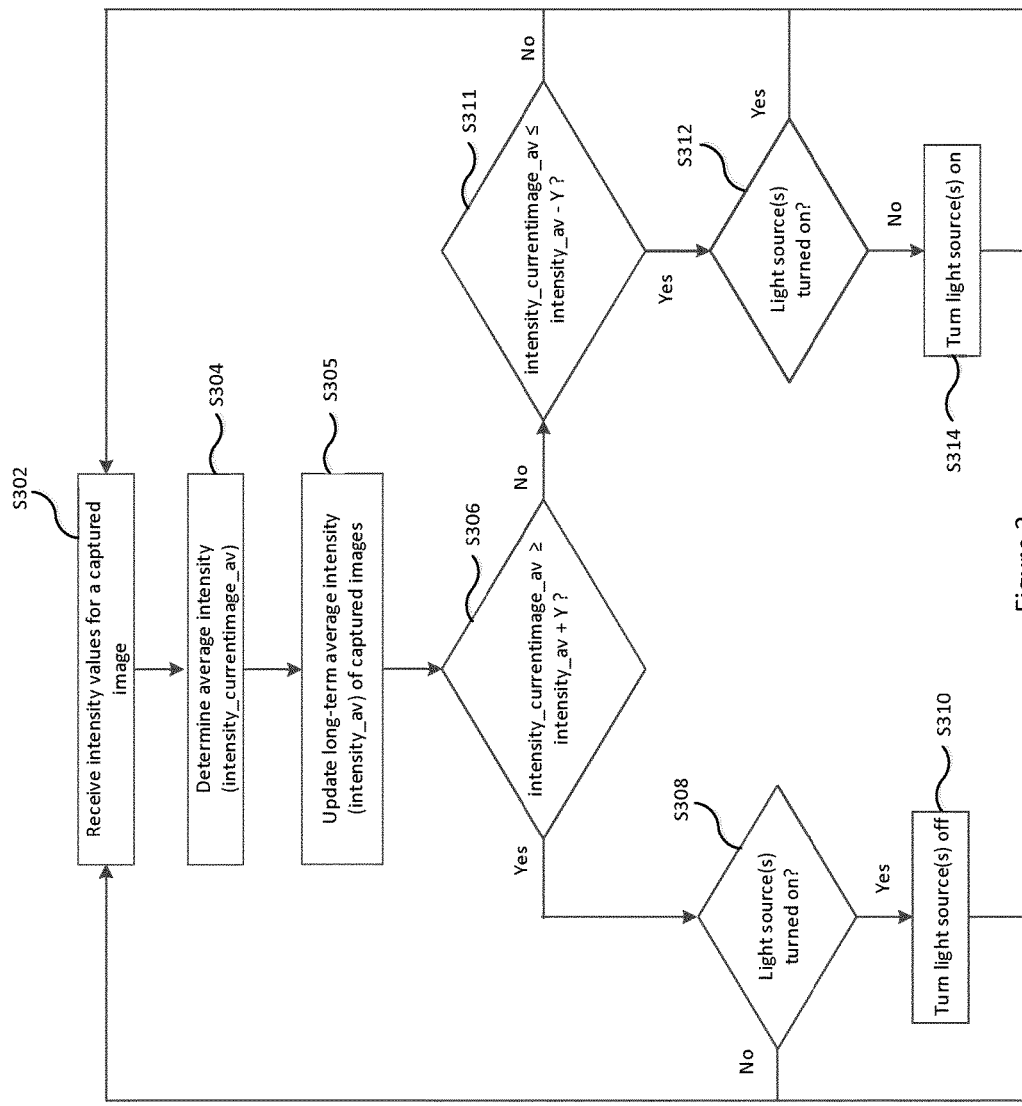
FIG. 3 is a flow chart of a method implemented by the controller to perform light sensing based on image data output from the optical sensor of the luminaire.

Reference is now made to FIG. 3 which is a flow chart of a process 300 implemented by the light sensing module 112 to perform light sensing based on the pixel data received from the optical sensor 108.

At step S302, the light sensing module 112 receives an intensity value from each of the pixels of the pixel array of the optical sensor 108, these intensity values define an image captured by the optical sensor 108.

At step S304 the light sensing module 112 determines an average of the plurality of intensity values that define the captured image, this is denoted intensity_currentimage_av in FIG. 3. The light sensing module 112 may perform this calculation itself, or the value of intensity_currentimage_av may be communicated from the optical sensor 108 to the light sensing module 112 (if the optical sensor 108 has the ability to report averaged intensities of regions of the field of view of the optical sensor 108).

The light sensing module 112 is configured to maintain a historical average of the average intensities of images captured by the optical sensor 108, this is denoted intensity_av in FIG. 2. The value of intensity_av may be stored in a memory of the luminarie 100 that is not shown in FIG. 1.

At step S305, the light sensing module 112 updates the value of intensity_av using the value of intensity_currentimage_av determined at step S304.

The light sensing module 112 may timestamp values of intensity_currentimage_av determined at step S304 and only allow values of intensity_currentimage_av that have been calculated within a certain time period from contributing to the calculation of intensity_av.

At step S306, the light sensing module 112 compares the average of the plurality of intensity values that define the captured image (intensity_currentimage_av) against the long-term average of the average intensities of images captured by the optical sensor 108 (intensity_av). In particular, the light sensing module 112 determines whether the intensity_currentimage_av value is greater than or equal to a threshold amount above the intensity_av value which is defined by an upper bound, intensity_av+Y.

If the light sensing module 112 determines at step S306 that the intensity_currentimage_av value is greater than or equal to the intensity_av+Y value, this indicates the presence of daylight in the environment of the luminaire 100, and the process 300 proceeds to step S308. At step S308, the light sensing module 112 determines whether the light source(s) 104 are turned on such that they are emitting light to illuminate the environment of the luminaire 100. If the light source(s) 104 are turned on, at step S310 the light sensing module 112 turns the light source(s) 104 off and the process 300 returns back to step S302. If the light source(s) 104 are already turned off, the light sensing module 112 takes no action and the process 300 returns back to step S302.

If the light sensing module 112 determines at step S306 that the intensity_currentimage_av value is less than the intensity_av+Y value, the process 300 proceeds to step S311.

At step S311, the light sensing module 112 determines whether the intensity_currentimage_av value is less than or equal to a threshold amount below the intensity_av value which is defined by a lower bound, intensity_av−Y. If the light sensing module 112 determines at step S311 that the intensity_currentimage_av value is less than or equal to the intensity_av−Y value, this indicates the absence of daylight in the environment of the luminaire 100 (e.g. night time), and the process 300 proceeds to step S312. At step S312, the light sensing module 112 determines whether the light source(s) 104 are turned on such that they are emitting light to illuminate the environment of the luminaire 100. If the light source(s) 104 are turned off, at step S314 the light sensing module 112 turns the light source(s) 104 on and the process 300 returns back to step S302. If the light source(s) 104 are already turned on, the light sensing module 112 takes no action and the process 300 returns back to step S302.

The value Y defining the threshold amount above and below the intensity_av value may not be constant and may be varied in dependence on other parameters (e.g. user-configurable or vary based on the time of day), or to increase detection sensitivity.

The long-term averaging and hysteresis provided by the lower and upper bounds prevent the luminaires immediately reacting to light level changes in the environment of the luminaire 100 (e.g. if a cloud is passing by quickly).

Whilst in the process 300 illustrated in FIG. 3 the light sensing module 112 turns the light source(s) 104 on in response to the absence of daylight in the environment of the luminaire 100 and turns the light source(s) 104 off in response to the presence of daylight in the environment of the luminaire 100, this is merely an example. In embodiments, in response to the absence of daylight in the environment of the luminaire 100 the light sensing module 112 is configured to control the light source(s) 104 in accordance with light settings associated with night time (e.g. defining one or more of the intensity, colour, saturation, colour temperature, size, shape, pattern, and dynamics of the light emitted from the the light source(s) 104), and in response to the presence of daylight in the environment of the luminaire 100 the light sensing module 112 is configured to control the light source(s) 104 in accordance with further light settings. Thus it will be apparent that during daylight, the light sensing module 112 may be configured to control the light source(s) 104 to emit light at a dim-downed light intensity and during night time dim up (increase the light intensity) the light emitted by the light source(s) 104.

Whilst the light sensing performed by the light sensing module 112 above is described above with reference to comparing the intensity_currentimage_av value to a single light intensity threshold value to turn the light source(s) 104 on or off. In other embodiments, the light sensing module 112 compares the intensity_currentimage_av value to a plurality of light intensity threshold value ranges each associated with respective light settings. Upon determining that the intensity_currentimage_av value falls within one of these light intensity threshold value ranges, the light sensing module 112 controls the light source(s) 104 in accordance with the light settings associated with the light intensity threshold value range.

By performing both presence detection and (day) light sensing based on the pixel data (intensity values) of captured images output by the optical sensor 108, this negates the need to have a separate dedicated presence sensor and light sensor on the luminaire. This advantageously reduces the physical size of the luminaire 100.

Whilst FIGS. 2 and 3 illustrates the controller 102 determining the average of the plurality of intensity values that define the captured image (intensity_currentimage_av) in both process 200 and 300 for clarity purposes, in other embodiments a single module of the controller 102 may perform this determination and make the computed value available to other modules of the controller 102.

In embodiments of the present invention, the optical sensor 108 can be used as a data receiver for the reception of commissioning commands transmitted from a remote device (a commissioning tool). Referring back to FIG. 1, the controller 102 also comprises a commissioning module 114 which is also arranged to receive the pixel data (intensity values) of captured images output by the optical sensor 108.

The commissioning module 114 is configured to decipher intensity variations into different commissioning commands and configure the luminaire 100 in accordance with detected commissioning commands.

In some cases the optical sensor 108 may consume a significant amount of power, more than what the luminaire 100 can supply to it continuously. The optical sensor 108 would therefore normally be used at a low sampling frequency (e.g. 10 Hz) to ensure that its peak power consumption can be handled adequately. In such a scenario, this has no significant impact on the presence detection performed by the presence detection module 110, however a higher sampling frequency (e.g. 10-1000 Hz frame rate) is required to ensure that the commissioning module 114 is able to pick up all the commands that are sent.

In the present invention this problem is dealt with by triggering the use of the higher sampling frequency in response to detecting the initiation of a data transfer by the remote device.

Figure 4:
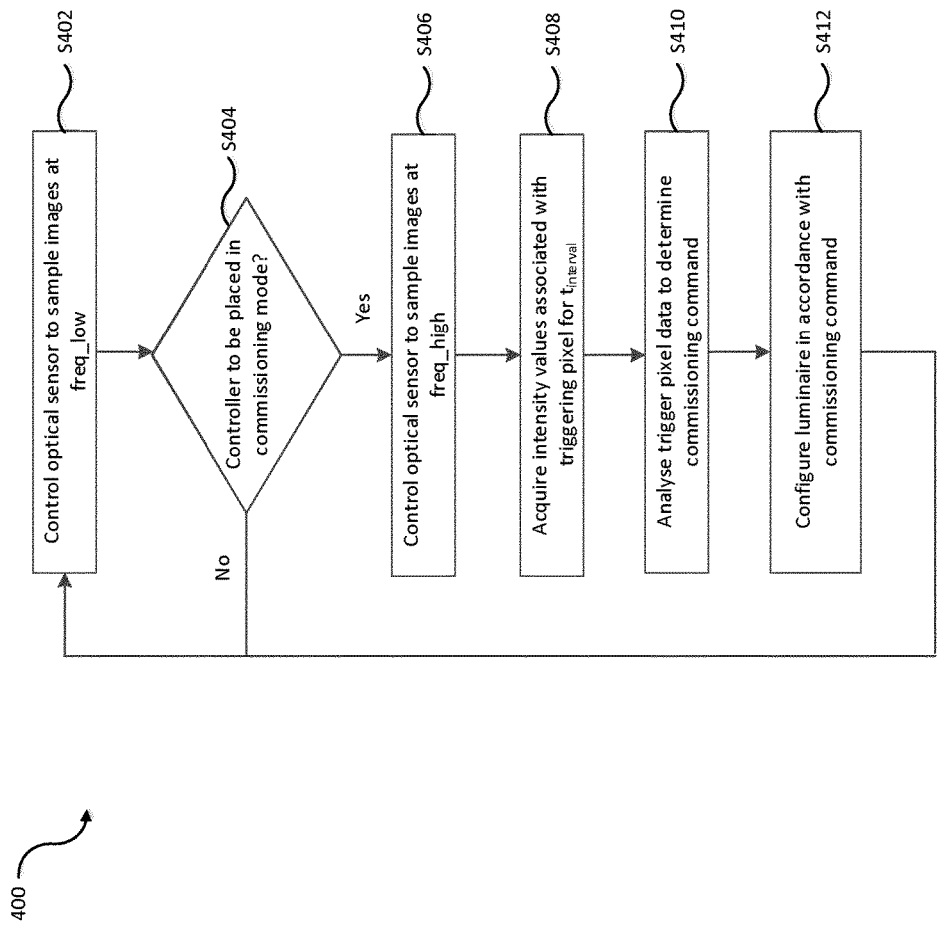
FIG. 4 is a flow chart of a method implemented by the controller to enable detection of commissioning commands based on image data output from the optical sensor of the luminaire.

This is described in more detail with reference to FIG. 4 which is a flow chart of a process 400 implemented by the commissioning module 114 to enable detection of commissioning commands transmitted from a remote device.

At step S402, the commissioning module 114 controls the optical sensor 108 to sample images at a sample frequency, freq_low. The sample frequency, freq_low, may for example be less than or equal to 10 Hz however it will be appreciated that it may take other values.

The sample frequency, freq_low, is used in order for the commissioning module 114 to verify, at step S404, whether a command has been received from a remote device indicating that the controller 102 is to operate in a commissioning mode.

In accordance with embodiments of the present invention, the commissioning module 114 may perform the determination at step S404 in one of a number of ways.

In one embodiment the commissioning module 114 may determine that a command has been received from a remote device indicating that the controller 102 is to operate in the commissioning mode based on a detection of a strong light source being present in the FOV of optical sensor 108. The commissioning module 114 is configured to detect the presence of a strong light source in the FOV of the optical sensor 108 by detecting whether the intensity incident on a subset of the pixels of the pixel array of the optical sensor 108 (one or more pixels, but not all pixels of the pixel array) has increased by more than a predetermined amount over a predetermined time period, and that the increased intensity is maintained for a predetermined period of time. That is, the commissioning module 114 is configured to detect the presence of a strong light source in the FOV of the optical sensor 108 by detecting a fast change of a pixel's intensity in a short time, whereby the intensity increase is faster than what a normal presence detection would generate, and which is not happening in all of the pixels in the pixel array of the optical sensor 108 (to filter out a change of light from the environment, caused by for example a neighbouring luminaire).

By overloading the optical sensor 108 with a sufficiently strong signal and holding it for an equally identifiable time period (e.g. 50-500 ms), the trigger is not likely to be confused by other events (e.g. sunlight). Even at low sampling frequencies the optical sensor 108 would be able to detect this special event and open itself to receipt of information by increasing its sampling frequency. In this way, power consumption of the optical sensor 108 can be kept at a minimum.

The integration/exposure period of the optical sensor 108 is chosen such that its dynamic range (approx. 60 dB) can cope with light levels expected in the observed area (typically 0 to 10K lux for office spaces). If the light source(s) of the remote device shines light directly onto the optical sensor 108 the element observing the light source could clip even if it would be a light pulse shorter than the integration period. However, because the luminaire 100 and light source(s) of the remote device are not synchronised the mechanism has to take into account the measurement frequency to be sure that the luminaire 100 observes this light signal. For example at 10 Hz with the optical sensor 108 having a 100 ms exposure time, the light signal should be at least 200 ms long to be sure that the light source of the remote device is observed during the exposure time of one image. Thus the light source of the remote device needs to transmit sufficient optical power to saturate one or more sensor element of the optical sensor 108 or at least result in significantly higher pixel intensities than expected from ambient lighting only.

In another embodiment the commissioning module 114 may determine that a command has been received from a remote device indicating that the controller 102 is to operate in the commissioning mode based on an observed shape of a light signal emitted by the remote device (the shape observed based on the intensity values output by the pixels of the pixel array of the optical sensor 108). In particular, the commissioning module 114 is configured to store predetermined pixel intensity information associated with one or more shapes and in response to detecting that light is emitted onto the pixel array in accordance with one of these shapes, the commissioning module 114 is configured to place the controller 102 in the commissioning mode. Sunlight or other ambient light would be observed by a large portion of the pixel elements with a random shape, whereas the light source(s) of the remote device should be observed as a more specific shape (e.g. rectangular in case of a display from a tablet).

In another embodiment, in the case of the optical sensor 108 being a RGB camera (wherein each pixel has three sub-sensing elements, each one with an R, G and B filter) the spectrum of the light emitted by the light source(s) of the remote device is used to distinguish between sunlight (and other ambient light) and the light emitted by the commissioning tool. That is, the commissioning module 114 is configured to determine that a command has been received from a remote device indicating that the controller 102 is to operate in the commissioning mode based on detecting light of one or more predetermined colour being incident on the pixel array of the optical sensor 108. Sunlight and other ambient light has a broad light spectrum that will be observed by the RGB sensing elements (pixels) of the pixel array of the optical sensor 108, while a remote device transmitting light of a single colour (e.g. only red, green or blue), a combination of two colours, or colours in a specific temporal pattern make the optical signal very specific and detectable by the commissioning module 114.

In another embodiment the commissioning module 114 may determine that a command has been received from a remote device indicating that the controller 102 is to operate in the commissioning mode based on detection of a predetermined intensity pattern of a light signal incident on the array of photodetectors. That is, the light source(s) may emit a light signal in accordance with an intensity pattern (e.g. emit flashing light) and the commissioning module 114 is able to detect this intensity pattern based on the intensity values output by the photodetectors. In response to detecting an intensity pattern associated with the commission mode, the commissioning module 114 is configured to place the controller 102 in the commissioning mode.

As shown in the process 400, in absence of detecting reception of a command indicating that the controller 102 is to operate in the commissioning mode, the commissioning module 114 continues to control the optical sensor 108 to sample images at the sample frequency, freq_low and the presence detection performed by the presence detection module 110 and the light sensing performed by the light sensing module remains enabled.

If the commissioning module 114 detects, at step S404, the reception of a command indicating that the controller 102 is to operate in the commissioning mode the process 400 proceeds to step S406 where the commissioning module 114 places the controller 102 in the commissioning mode.

When the controller 102 is operating in the commissioning mode, the presence detection performed by the presence detection module 110 and the light sensing performed by the light sensing module is disabled, and the commissioning module 114 controls the optical sensor 108 to sample images at a higher sample frequency, freq_high, this assists in the reception of commissioning commands. The sample frequency, freq_high, may for example be between approximately 10-1000 Hz however it will be appreciated that it may take other values which are higher than freq_low. In theory the light source of the remote device is observed by every pixel. In most image sensors it is possible to read-out a single line of pixels. This line can be acquired at a sampling rate much higher than 1 KHz. Take a VGA sensor of 640×480 that can run at 100 frames per second as an example, this imager is able to scan a single line in 480 lines*100 frames per second=4.8 KHz. If it were possible to scan an individual pixel only, it would be possible to achieve sample frequencies 640 times larger (30 MHz). In practice, the amount of photons we can capture during the short exposure time of 0.03 microseconds is limited and therefore requires a strong light source which has eye-safety implications. With an image sensor of the luminaire positioned in an indoor environment, the integration time (otherwise known as exposure time) can be set to a minimum of 0.08 ms. With a remote device that emits much more light than that emitted by other light sources in the indoor environment it is possible to have sampling frequencies of at least 12.5 KHz without being limited by eye-safety issues It can be seen that the detection of the command acts as a trigger for a faster data acquisition to be performed by the optical sensor 108.

Whilst it is described above, that the presence sensing/light sensing is disabled when the controller 102 is operating in the commissioning mode, in other embodiments the the presence detection performed by the presence detection module 110 and the light sensing performed by the light sensing module may still be enabled but with a decreased frequency/performance since it may be possible that some data can still be reused (i.e. presence data can still be seen interleaved with commissioning commands).

At step S408, the commissioning module 114 acquires intensity values associated with one or more triggering pixel (pixel(s) whose output signal triggered the higher sampling) for a predetermined time interval, $t_{interval}$. The time interval, $t_{interval}$, may be between 1-10 seconds, however it will be appreciated that it may take other values. The remote device transmits commissioning commands using coded light techniques whereby data is modulated into the light (time-varying optical signal) emitted by a light source of the remote device. In this way the data defining a commissioning command may be said to be embedded into the light emitted from the light source. If the optical sensor 108 is sensitive to infra-red light, the remote device may embed a commissioning command in infra-red light emitted from the light source of the remote device. If the optical sensor 108 is not sensitive to infra-red light, the remote device may embed a commissioning command in visible light emitted from the light source of the remote device.

The remote device is configured to transmit commissioning commands in accordance with a specified communication protocol which defines the format of the commands (for example indicating the length of a command in bits, and defining what each bit represents), modulation technique, carrier frequency etc. The communications protocol may be a proprietary protocol. For example the RC-5 or RC-6 communications protocol by Philips may be used if the optical sensor 108 is able to detect the 889 µs envelope of the Manchester encoded signal and the intensity variation in the signal is strong enough not to be masked by spontaneous fluctuations in the background level. Another proprietary protocol may be used if the optical sensor 108 is not able to perform this detection. In other embodiments the communications protocol may be a non-proprietary protocol.

One way to implement coded light is by amplitude keying, by switching the amplitude or power of the emitted light between discrete levels in order to represent channel bits (or more generally channel symbols). For instance in the simplest case, when the light source of the remote device is on (emitting) this represents a channel bit of value 1 and when the light source of the remote device is off (not emitting) this represents a channel bit of value 0, or vice versa. A pixel in the pixel array of the optical sensor 108 can detect when the light is on or off, or distinguish between the different levels, and thereby receive the channel bits or symbols. A commissioning command may be transmitted in the form of a bit-stream (defining a light pattern) with a specific sequence of turning light source of the remote device on/off that can be processed within the limitations of the optical sensor's frame of pixel readout rate.

In order to communicate the data, the modulation typically involves a coding scheme to map data bits (sometimes referred to as user bits) onto channel symbols. Different amplitude modulation schemes may be used to transmit commissioning commands from the remote device to the luminaire 100. Possible amplitude modulation schemes include pulse distance encoding (whereby the distance between pulses defines a bit of value 1 or 0 respectively and the pulse width is constant), pulse width encoding (whereby the pulse width defines a bit value of 1 or 0 respectively and the pulse distance is constant), pulse position encoding (whereby the timescale is divided into the constant length time intervals and the presence of pulse(s) in a time interval defines a bit of value 1 and the absence of pulse(s) in a time interval defines a bit of value 0), Manchester coding (whereby the polarity of a transition defines the logical level, for example a mark-to-space transition defines a bit of value '1', and a space-to-mark transition defines a bit of value '0') or another line code. Whilst amplitude modulation is referred to herein, other modulation schemes may be used (e.g. frequency modulation, phase modulation etc.). Persons skilled in the art will appreciate that the optical sensor 108 may have to implement certain detection techniques for other modulation methods e.g. frequency modulation would require the optical sensor to operate as a rolling shutter camera (whereby the pixels of the pixel array are divided into a plurality of lines, typically horizontal lines, i.e. rows, which are exposed in sequence line-by-line).

In the example whereby line coding is used, a fixed starting bit may be used to clearly mark the beginning of the pattern to be emitted, and/or a fixed stopping bit may be used to clearly mark the ending of the pattern to be emitted.

In the example whereby the remote device embeds a commissioning command in infra-red light emitted from the light source of the remote device, a carrier frequency is used to transmit the bit-stream so that the optical sensor 108 can distinguish the IR light from other ambient IR frequencies.

After expiry of the predetermined time interval, $t_{interval}$, at step S410 the commissioning module 114 analyses the acquired data output from the triggering pixel to see if there is a discernible pattern transmitted in accordance with the specified communication protocol by the remote device that is recognizable as a commissioning command. Depending on the capabilities of the optical sensor 108, this may be performed by the the commissioning module 114 by reading out the pixel data of the entire frame for a number of times and performing subsequent analysis of the appropriate triggering pixel's pixel data, or by direct readout of the triggering pixel's pixel data.

Furthermore, after expiry of the predetermined time interval, $t_{interval}$, the commissioning module 114 is configured to place the controller 102 in a normal operating mode (leave the commissioning mode) such that the presence detection performed by the presence detection module 110 and the light sensing performed by the light sensing module is enabled, and the commissioning module 114 controls the optical sensor 108 to return to sampling images at the sample frequency, freq_low.

In response to detecting reception of a commissioning command, at step S412 the commissioning module 114 configures the luminaire 100 in accordance with the received commissioning command.

A commissioning command may configure the luminaire 100 in one of various ways.

A commissioning command may assign the luminaire 100 a group identifier that is also assigned to one or more further luminaires that are connected to the luminaire 100 within a lighting system.

This enables a user to operate a remote device to select the group of luminaires, and to manually input one or more parameters of the light to be emitted by that group of luminaires, e.g. to set a numerical value for the overall intensity of the emitted light and/or to set individual numerical values for the red, green and blue (RGB) components of the light. Furthermore, this enables the luminaire 100 to respond to only the presence/light sensing implemented on the other luminaires in the assigned group, and control only the other luminaires in the assigned group in response to presence detection and light sensing implemented by the presence detection module 110 and light sensing module 112 respectively.

Other typical commissioning commands are known to persons skilled in the art and are therefore not discussed in detail herein. For example a commissioning command may be a command for the luminaire 100 to open a network of luminaires, join a network of luminaires, close a network of luminaires, leave a network of luminaires, or to reset to factory settings.

In an alternative embodiment, the remote device is configured to repeat transmission of a commissioning command embedded in light emitted by light source(s) of the remote device. In this embodiment, the commissioning module 114 may control the optical sensor 108 to only sample images at the sample frequency, freq_low, and recognize a complete commissioning command based on detecting portions of the commissioning command over multiple messages cycles. Alternatively, the commissioning module 114 may detect reception of a portion of a commissioning command whilst the optical sensor 108 is sampling images at the sample frequency, freq_low, and in response to this detection control the optical sensor 108 to sample images at a higher sample frequency, freq_high such that the complete commissioning command can be received in a subsequent transmission from the remote device.

As shown in FIG. 1, the luminaire 100 comprises a network interface 106 to facilitate communication with other luminaires that are connected to the luminaire 100 within the lighting system.

The luminaire 100 may communicate with the other luminaires via a wireless connection, in which case the interface 106 comprises a wireless communications interface e.g. a wireless interface such as Wi-Fi, Zigbee, Bluetooth or other short-range radio frequency (RF) wireless access technology interface. For instance, in the case of Wi-Fi, the wireless connection may be via a local Wi-Fi network and hence via a Wi-Fi router disposed in the environment of the luminaire 100; or in the case of ZigBee or Bluetooth, the wireless connection may not involve any intermediate router, and may instead for example be based on a mesh network or ad-hoc connection with the other luminaires or devices (e.g. a Bluetooth wall switch or user device such as a tablet running a luminaire lighting control software application).

Alternatively the luminaire 100 may be configured to communicate with the other luminaires via a wired connection e.g. via an Ethernet or DMX network, in which case the interface 106 comprises a wired communications interface. Examples of wired and wireless communication interfaces are well known to persons skilled in the art and are therefore not discussed in detail herein.

In response to being placed in the commissioning mode and/or detecting the reception of a commissioning command whilst operating in the commissioning mode, the commissioning module 114 may control the light source(s) of the optical sensor 108 to provide a visual indication that the luminaire has been successfully placed in the commissioning mode and/or to provide a visual indication that the commissioning command has been successfully interpreted by the luminaire 100. Using the light source(s) of the optical sensor 108 to provide this indication function removes the necessity for a dedicated indicator LED. This advantageously reduces the physical size of the luminaire 100.

Alternatively or additionally, in response to being placed in the commissioning mode and/or detecting the reception of a commissioning command, the commissioning module 114 may control the light source(s) 104 to provide a temporary visual indication that the luminaire has been successfully placed in the commissioning mode and/or to provide a visual indication that the commissioning command has been successfully interpreted by the luminaire 100 (e.g. by changing the intensity level of the light emitted by the light source(s) 104.

The remote device referred to above may be a remote control device that has a dedicated function to control the luminaire 100.

Alternatively the remote device may be used for other functions apart from controlling the luminaire 100. For example, the remote device may be a mobile telephone, tablet, laptop computer, a personal digital assistant ("PDA"), etc. The remote device may emit the light pattern using a display screen of the remote device that is unique and detectable by the optical sensor 108 and recognisable as a commissioning command by the commissioning module 114. In another example, a light source (e.g. a high-power LED) integrated into the remote device may emit the light pattern. In yet another example, the remote device may communicate with an external light emitting device that comprises a light source (e.g. a high-power LED) to emit the light pattern. The external light emitting device may be powered by its own power source (battery), or via the remote device. The communication from the remote device towards the external light emitting device may be performed using for example a USB interface on the remote device, or an audio output interface (e.g. headphone socket) on the remote device.

Whilst embodiments have been described above with reference to the commissioning command being transmitted using light emitted by a remote device, in other embodiments, the commissioning module may place the controller 102 in the commissioning mode based on the output of the optical sensor 108 and receive a commissioning command via network interface 106 that is transmitted via a wireless communication protocol (e.g. Wi-Fi, Bluetooth etc.) instead of optical communication. In this scenario, other luminaires that are connected within the lighting system may also receive the commissioning command via their respective network interfaces but only those that have been placed in the commissioning will configure the luminaire in accordance with the received commissioning command.

In embodiments described above, an installer may point a remote device at the luminaire 100 to be commissioned and gets a visual indication that the luminaire 100 is able to receive commissioning commands. If by accident two luminaires indicate that they can be programmed the installer can retry to select only one luminaire. When the right luminaire is selected the installer can transmit a commissioning command by pressing a button (or other interaction) on the remote device. When the luminaire is selected the device pointing is not critical anymore since only the coupled luminaire will listen to the information.

If the luminaires are part of a connected lighting infrastructure double assignments can be detected and also indicated by the led indicator. The installer could even decide to commission both luminaires because they need to be allocated to the same light control group. A user may first cluster luminaires before configuring them simultaneously. First the user must notify the lighting network that they want to commission multiple luminaires and program them with the same characteristics. Therefore the user must first provide the commissioning trigger to all the luminaire that are to be commissioned. In practice the user would need to repeat the pointing procedure for each individual luminaire if they do not share the same field of view. If all required luminaires are clustered then the user is able to provide programming commands to one of the luminaires which will be shared through the network of luminaires. The shared programming can also be performed without connected lighting when sensor modules share the same field of view.

It will be appreciated that the above embodiments have been described only by way of example.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The terms "controller" and "module" as used herein generally represent software, firmware, hardware, or a combination thereof. In the case of a software implementation, the controller or module represents program code that performs specified tasks when executed on a processor (e.g. CPU or CPUs). The program code can be stored in one or more computer readable memory devices. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A luminaire comprising:
    at least one light source for emitting light to illuminate an environment of the luminaire;
    an optical sensor comprising an array of photodetectors, the optical sensor configured to output image data indicative of the intensity of light incident on the photodetectors; and
    a controller arranged to receive the image data, the controller comprising:
        a presence detection module configured to process the image data to detect whether a being is present in said environment, and to control the light emitted by the at least one light source in response to said detection;
        a light sensing module configured to process the image data to determine a light level in said environment and to control the light emitted by the at least one light source based on said light level; and
        a commissioning module configured to process the image data to recognize a command transmitted by a remote device indicating that the controller is to operate in a commissioning mode,
        wherein based on reception of said command, the controller is configured to operate in the commissioning mode, and while the controller is operating in the commissioning mode, the commissioning module being configured to receive a commissioning command transmitted from the remote device, and to configure the luminaire in accordance with the received commissioning command, and
        wherein the commissioning module is configured to recognize said command, based on a detection of an increase in intensity values output by only a subset of the photodetectors, by at least a predetermined amount, within a predetermined period of time.

2. The luminaire according to claim 1, wherein the commissioning module is configured to:
    control the optical sensor to operate at a first sampling frequency;
    based on reception of said command, control the optical sensor to operate at a second sampling frequency for a predetermined time interval, the second sampling frequency being higher than the first sampling frequency; and
    analyse the image data output from the one or more photodetectors during the predetermined time interval to receive said commissioning command.

3. The luminaire according to claim 2, wherein the commissioning module is configured to recognize said command based on a detection of an increase in intensity values output by a plurality of the photodetectors, the plurality of photodetectors forming a predetermined shape within said array of photodetectors.

4. The luminaire according to claim 2, wherein the commissioning module is configured to recognize said command based on a detection of light of one or more predetermined colours being incident on the array of photodetectors.

5. The luminaire according to claim 2, wherein the commissioning module is configured to recognize said command based on a detection of a predetermined intensity pattern of a light signal incident on the array of photodetectors.

6. The luminaire according to claim 1, wherein the commissioning module is configured to process the image data to recognize the commissioning command embedded in light emitted by the remote device.

7. The luminaire according to claim 2, wherein the commissioning module is configured to control the optical sensor to operate at the first sampling frequency upon expiry of the predetermined time interval.

8. The luminaire according to claim 1, wherein the commissioning module is configured to recognize a commissioning command embedded in light emitted by a remote device based on detection of a light pattern transmitted in accordance with a communication protocol.

9. The luminaire according to claim 1, wherein the luminaire comprises a wireless interface, and the commissioning module is configured to receive the commissioning command via said wireless interface.

10. The luminaire according to claim 1, wherein the presence detection module and the light sensing module are disabled when the controller is operating in the commissioning mode.

11. The luminaire according to claim 1, wherein the optical sensor comprises at least one light source.

12. The luminaire according to claim 11, wherein in response to detecting presence of a being in said environment, the presence detection module is configured to control the at least one light source of the optical sensor to emit light to provide a visual indication that presence of the being has been detected.

13. The luminaire according to claim 11, wherein in response to recognizing said command, the commissioning module is configured to control one or more of: (i) the at least one light source of the optical sensor, and (ii) the at least one light source of the luminaire, to emit light to provide a visual indication of reception of said command.

14. A computer program product comprising code embodied on a non-transitory computer-readable medium and being configured so as when executed on a processor of a luminaire, to:
    receive image data output from an optical sensor of the luminaire, the optical sensor comprising an array of photodetectors and the image data is indicative of the intensity of light incident on the photodetectors;
    detect whether a being is present in said environment based on the image data, and control the light emitted by at least one light source of the luminaire in response to said detection;
    determine a light level of light in said environment based on the image data, and control the light emitted by the at least one light source based on said light level; and
    recognize a command transmitted by a remote device indicating that the controller is to operate in a commissioning mode based on the image data; based on reception of said command configure the controller to operate in the commissioning mode; whilst the controller is operating in the commissioning mode receive a commissioning command transmitted from the remote device; and configure the luminaire in accordance with the received commissioning command, wherein the step of recognizing said command is based on a detection of an increase in intensity values output by only a subset of the photodetectors, by at least a predetermined amount, within a predetermined period of time.

* * * * *